(12) United States Patent
Vadnere et al.

(10) Patent No.: US 12,317,773 B2
(45) Date of Patent: Jun. 3, 2025

(54) SELF-PROPELLED AGRICULTURAL HARVESTER MACHINE AND HEADER ASSEMBLY CONTROL SYSTEM

(71) Applicant: Deere & Company, Moline, IL (US)

(72) Inventors: Mohan A. Vadnere, Pune (IN); Hrishikesh Y. Raste, Pune (IN)

(73) Assignee: Deere & Company, Moline, IL (US)

( * ) Notice: Subject to any disclaimer, the term of this patent is extended or adjusted under 35 U.S.C. 154(b) by 327 days.

(21) Appl. No.: 18/165,748

(22) Filed: Feb. 7, 2023

(65) Prior Publication Data
US 2024/0260506 A1 Aug. 8, 2024

(51) Int. Cl.
| A01D 34/00 | (2006.01) |
| A01D 34/74 | (2006.01) |
| A01D 34/66 | (2006.01) |

(52) U.S. Cl.
CPC ........... *A01D 34/006* (2013.01); *A01D 34/74* (2013.01); *A01D 34/66* (2013.01)

(58) Field of Classification Search
CPC ...... A01D 34/006; A01D 34/66; A01D 34/74; A01D 41/141
See application file for complete search history.

(56) References Cited

U.S. PATENT DOCUMENTS

| 5,402,628 A * | 4/1995 | Minamoto ............. A01D 34/86 56/17.1 |
| 7,222,475 B2 | 5/2007 | Bomleny et al. |
| 7,661,251 B1 | 2/2010 | Sloan et al. |
| 10,477,774 B2 | 11/2019 | Hill et al. |
| 11,219,162 B2 | 1/2022 | Brimeyer et al. |
| 11,483,972 B2 | 11/2022 | Dima et al. |
| 2002/0193928 A1* | 12/2002 | Beck ..................... A01B 79/005 701/50 |
| 2013/0186657 A1* | 7/2013 | Kormann ............. A01B 69/004 172/278 |
| 2014/0215992 A1 | 8/2014 | Schraeder |

(Continued)

FOREIGN PATENT DOCUMENTS

EP 2910098 A1 * 8/2015 ............. A01B 39/18

OTHER PUBLICATIONS

DE 102016212201 A1 with English translation; date published Jan. 11, 2018; date filed Jul. 5, 2016. (Year: 2018).*

(Continued)

*Primary Examiner* — Calvin Cheung
(74) *Attorney, Agent, or Firm* — Lucian Wayne Beavers; Patterson Intellectual Property Law PC

(57) ABSTRACT

A self-propelled agricultural harvester machine comprising a machine frame, a plurality of ground engaging units for supporting the machine frame from a ground surface, a header assembly for harvesting stalked crops, the header assembly being supported from the machine frame so that the header assembly can be raised, lowered, and tilted relative to the machine frame, at least a first sensor configured to sense at least an orientation of the stalked crops in a path of the agricultural harvester machine, the first sensor configured to output a crop orientation signal, and a controller configured to receive the crop orientation signal from the first sensor and to regulate a header assembly angle relative to the machine frame at least in part in response to the crop orientation signal.

15 Claims, 12 Drawing Sheets

(56) References Cited

U.S. PATENT DOCUMENTS

| | | | |
|---|---|---|---|
| 2016/0270290 A1* | 9/2016 | Johnson | A01D 75/287 |
| 2019/0029176 A1* | 1/2019 | Yanke | A01D 41/14 |
| 2020/0236833 A1* | 7/2020 | Kremmer | A01B 63/10 |
| 2021/0000010 A1* | 1/2021 | Gunda | A01D 47/00 |

OTHER PUBLICATIONS

"Adjustable gauge shoes" (2010) printout from http://salesmanual.deere.com/sales/salesmanual/en_NA/hay_forage/2011/feature/mower_conditioners/cutterbar/600_800_gauge_shoes.html (1 page) (last updated: Jul. 29, 2010).

* cited by examiner

SELF-PROPELLED AGRICULTURAL HARVESTER MACHINE AND HEADER ASSEMBLY CONTROL SYSTEM

FIELD OF THE DISCLOSURE

The present disclosure relates to self-propelled agricultural harvester machines including but not limited to a forage harvester or a windrower.

BACKGROUND

Agricultural harvester machines perform a variety of operations. In some instances, agricultural harvester machines are configured to travel through an agricultural field, cutting crops loose from the field and gathering them.

It is common for agricultural harvester machines (such as combine harvesters, forage harvesters, windrowers, and the like) to include a header. The header can be pivotally attached to a machine frame of the agricultural harvester machine such that the header can be raised, lowered, and tilted relative to the machine frame, and thus relative to a ground surface. As the agricultural harvester machine travels, the header engages crop, severs it, and outputs the crop from the rear of the header. In the hay and forage industry, the severed crops are distributed on the ground surface and allowed to dry before it is baled or otherwise collected. In other industries, the severed crops are collected and stored by the agricultural harvester machine.

Lodged and bent crops, especially crops laying away from the agricultural harvester machine, can lead to poor cutting performance of the header, which in turn leads to crop loss. A skillful operator must make multiple adjustments to the agricultural harvester machine to obtain better performance. These adjustments amount to costly machine downtime.

Accordingly, a need exists for improvements in agricultural harvester machines.

SUMMARY OF THE DISCLOSURE

In one embodiment a self-propelled agricultural harvester machine comprises a machine frame, a plurality of ground engaging units for supporting the machine frame from a ground surface, a header assembly for harvesting stalked crops, the header assembly being supported from the machine frame so that the header assembly can be raised, lowered, and tilted relative to the machine frame, at least a first sensor configured to sense at least an orientation of the stalked crops in a path of the agricultural harvester machine, the first sensor configured to output a crop orientation signal, and a controller configured to receive the crop orientation signal from the first sensor and to regulate a header assembly angle relative to the machine frame at least in part in response to the crop orientation signal.

In other aspects of the disclosure, the self-propelled agricultural harvester machine comprises a machine frame, a plurality of ground engaging units for supporting the machine frame from a ground surface, and a header assembly for harvesting stalked crops. The header assembly is supported from the machine frame so that the header assembly can be raised, lowered, and tilted relative to the machine frame. The header assembly includes one or more adjustable gauge shoes supported by the header assembly, a cutterbar supported by the header assembly, and one or more gauge shoe actuators being connected to a respective one of the one or more gauge shoes and configured to adjust a gauge shoe extension relative to the cutterbar.

Numerous objects, features and advantages of the present invention will be readily apparent to those skilled in the art upon a review of following description in conjunction with the accompanying drawings.

DETAILED DESCRIPTION

Figure 1:
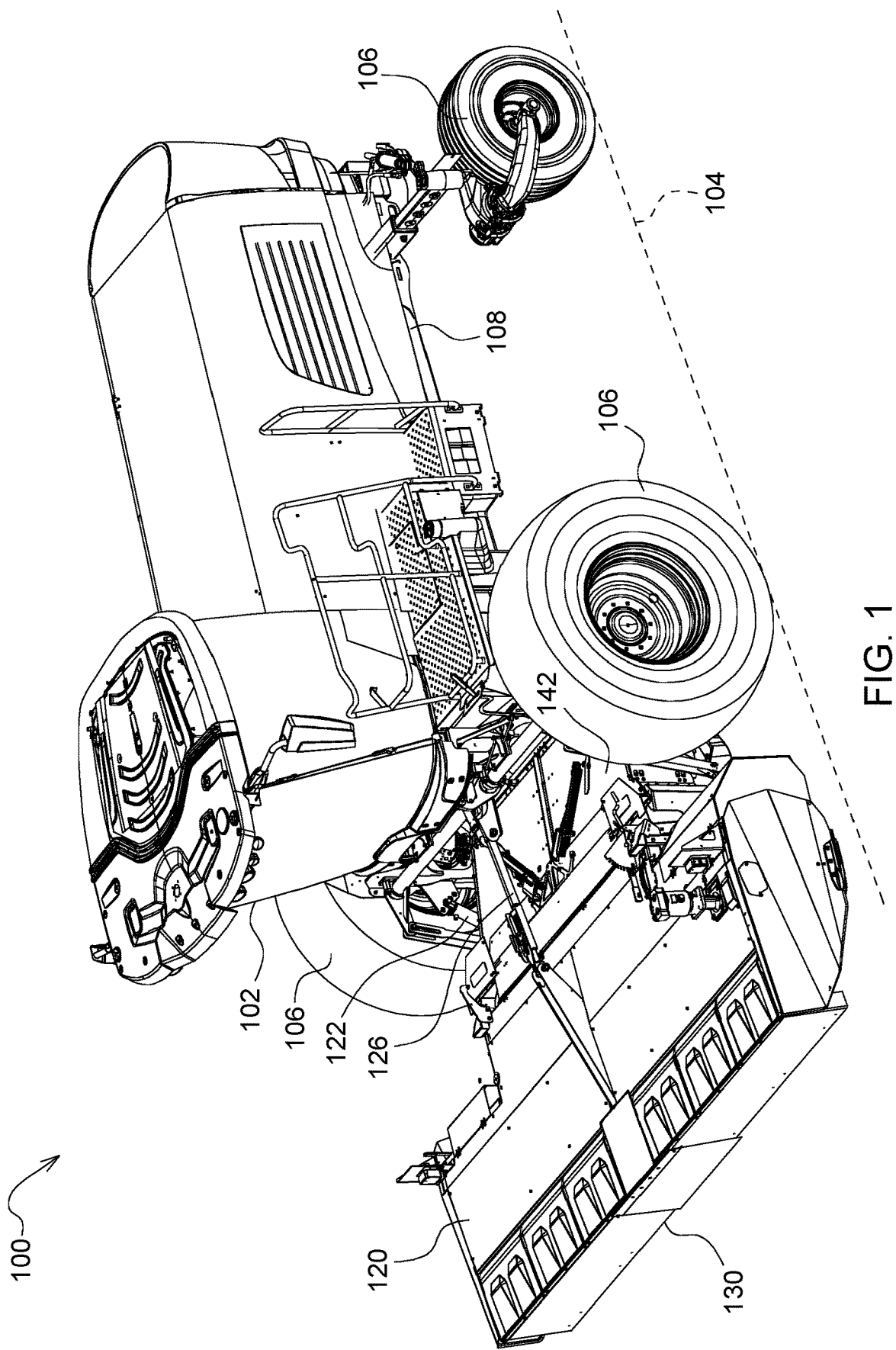
FIG. 1 is a front perspective view of a self-propelled agricultural harvester machine including a header assembly.
Figure 2:
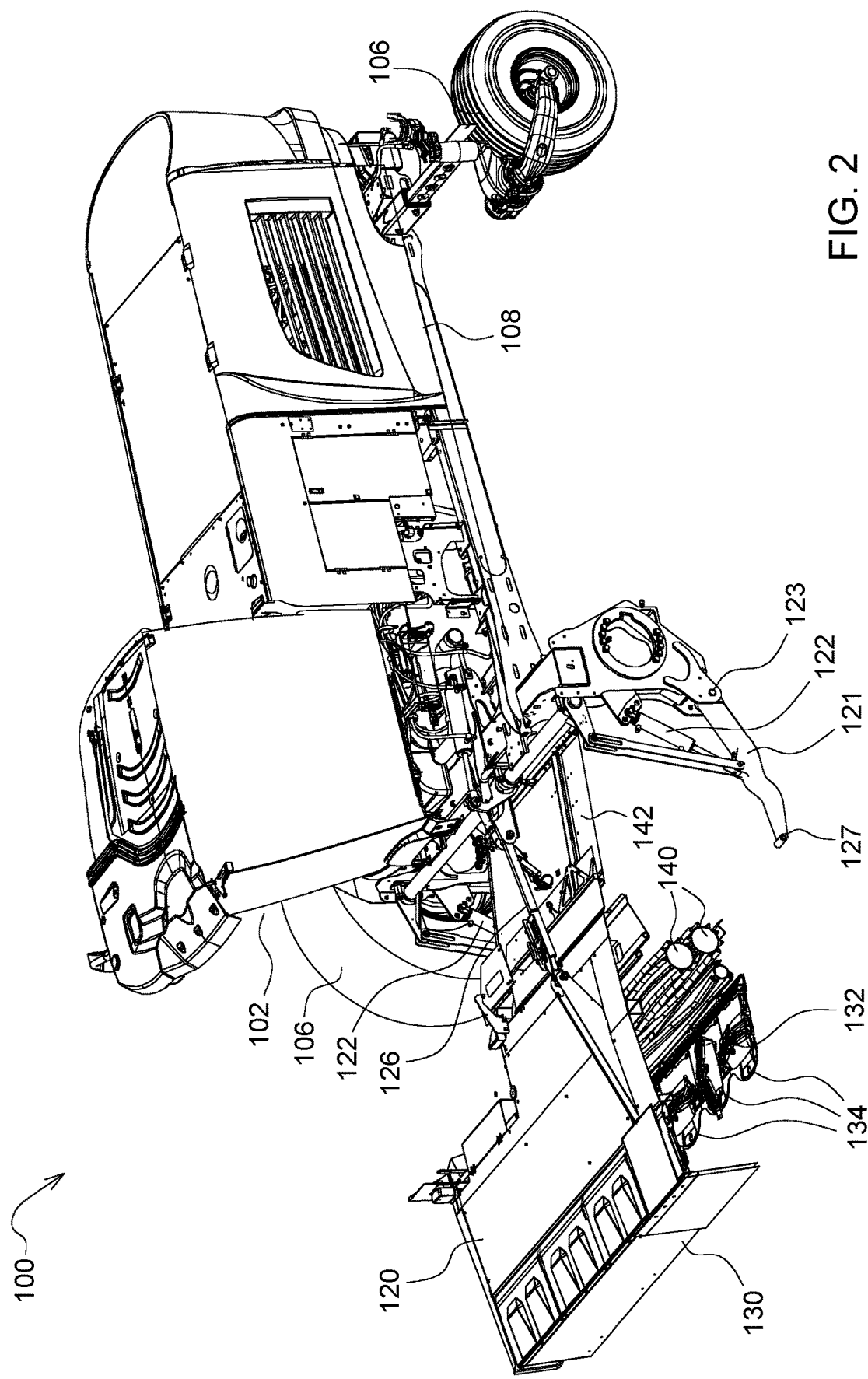
FIG. 2 is a front perspective view of the self-propelled agricultural harvester machine where portions of the left side of the agricultural harvester machine are deconstructed.

Referring now to the drawings and particularly to FIGS. 1 and 2, a self-propelled agricultural harvester machine is shown and generally designated by the number 100. The agricultural harvester machine 100 is illustrated as a windrower, but may be any agricultural harvester machine which may connect to a header, such as a combine harvester or forage harvester, to name a few examples. The agricultural harvester machine 100 may perform a number of operations, including grain harvesting, windrowing, or mowing, to name a few operations. As used herein, direction with regard to the agricultural harvester machine 100 may be referred to from the perspective of an operator seated within operator station 102: the left of agricultural harvester machine 100 is to the left of such an operator, the right of agricultural harvester machine 100 is to the right of such an operator, the front or fore of agricultural harvester machine 100 is the direction such an operator faces, the rear or aft of agricultural harvester machine 100 is behind such an operator, the top of agricultural harvester machine 100 is above such an operator, and the bottom of agricultural harvester machine 100 is below such an operator.

The agricultural harvester machine 100 is supported from or on a ground surface 104 by a plurality of ground engaging units generally designated by the number 106, which provide rolling support to machine frame 108 and traction. The ground engaging units 106 may be wheels as shown in FIG. 1, or alternatively may be crawler track units. The ground engaging units 106 may be powered directly or indirectly by one or more electric, internal combustion, or hydraulic motors to drive the agricultural harvester machine 100. An operator controls the agricultural harvester machine 100 from the operator station 102 located on the machine frame 108.

Machine frame 108 provides strength and support to the agricultural harvester machine 100, and interconnects the components of the agricultural harvester machine 100. A header assembly 120 for harvesting stalked crops is supported from the machine frame 108 so that the header assembly can be raised, lowered, and tilted relative to the machine frame 108.

Figure 3:
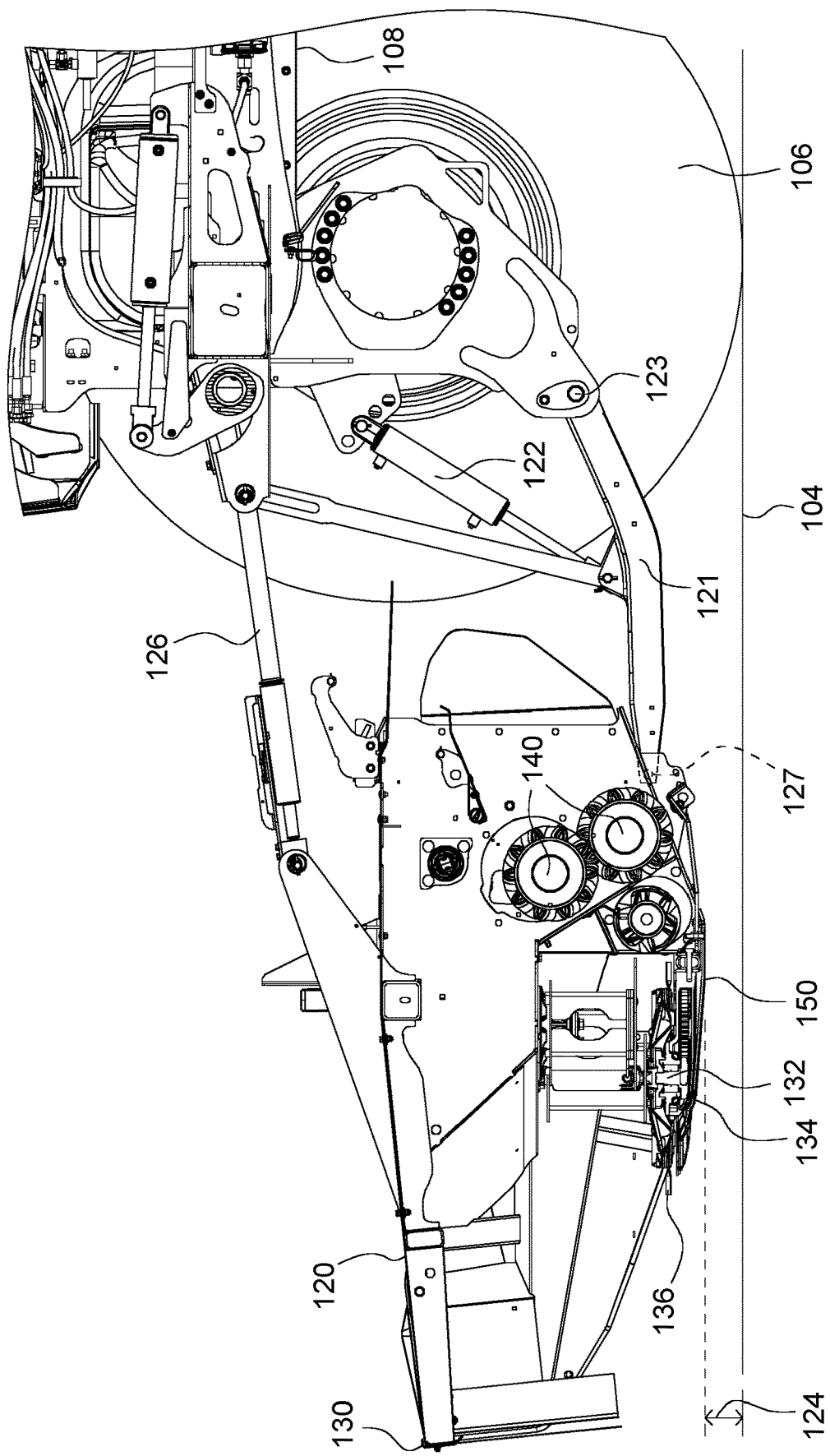
FIG. 3 is a left side partial view of the header assembly where portions of the header assembly are partially deconstructed.

Referring now to FIG. 3, the agricultural harvester machine 100 includes a plurality of lifting arms 121 and one or more lift actuators 122. The plurality of lifting arms 121 are each pivotally connected to the machine frame 108 at pivotal connection 123. The one or more lift actuators 122 lifts the plurality of lifting arms 121 which in turn lifts the header assembly 120. The lift actuator 122 is configured to adjust a header assembly height 124 relative to the ground surface 104. When the lift actuator 122 is retracted, the header assembly 120 is lifted into the air, thereby increasing the header assembly height 124. When the lift actuator 122 is extended, the header assembly 120 is lowered toward the ground surface 104, thereby decreasing the header assembly height 124.

Figure 4:
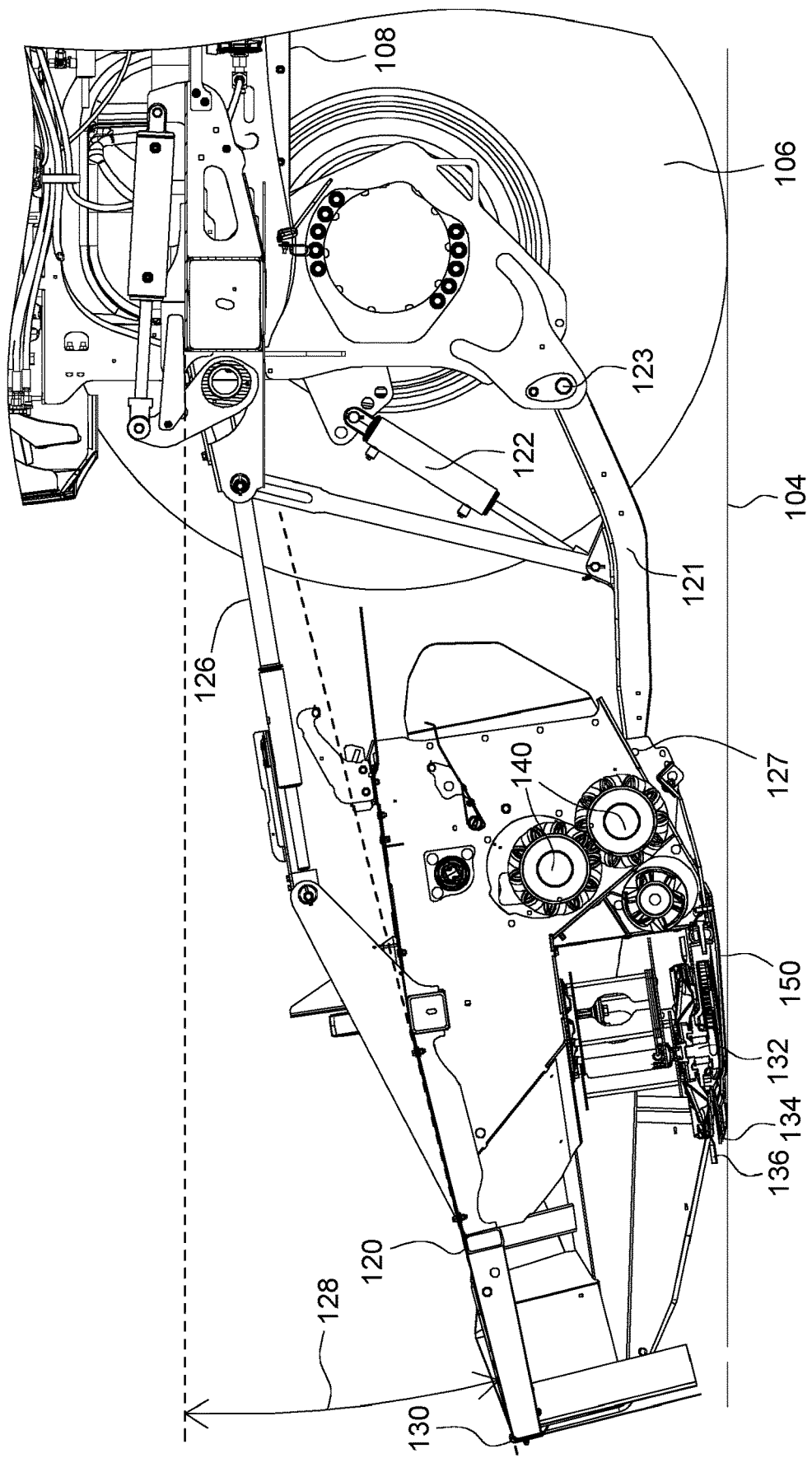
FIG. 4 is a left side partial view of the header assembly in a tilted configuration where portions of the header assembly are partially deconstructed.

Referring now to FIG. 4, the agricultural harvester machine 100 includes one or more tilt actuators 126. The plurality of lifting arms 121 are each pivotally connected to the header assembly 120 at pivotal connection 127. The one or more tilt actuators 126 tilt the header assembly 120 about pivotal connection 127. The one or more tilt actuators 126 are configured to adjust a header assembly angle 128 relative to the machine frame 108. When the tilt actuator 126 is retracted, a fore end 130 of the header assembly 120 is lifted into the air, thereby decreasing the header assembly angle 128. When the tilt actuator 126 is extended, the fore end 130 of the header assembly 120 is lowered toward the ground surface 104, thereby increasing the header assembly angle 128.

Figure 5:
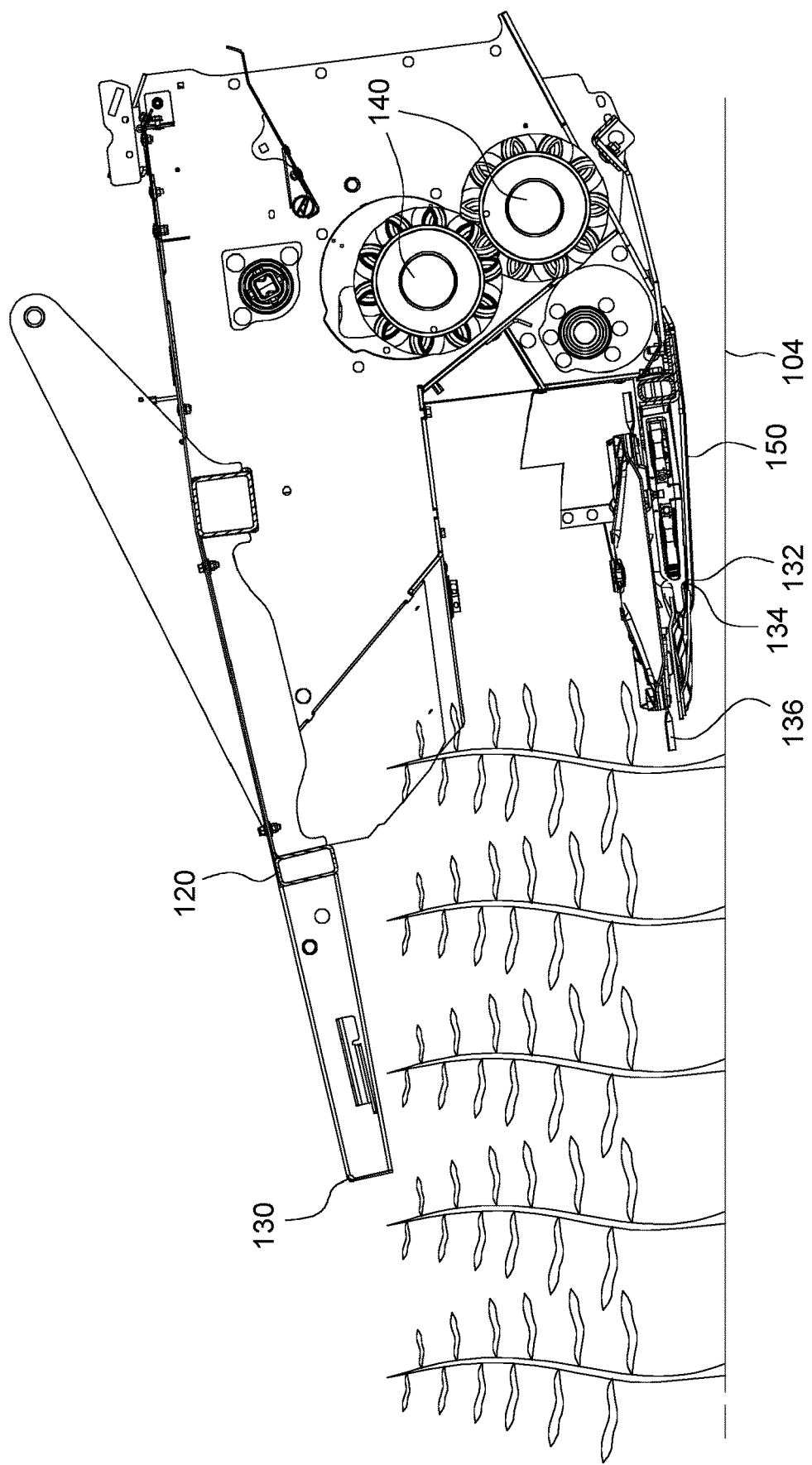
FIG. 5 is a left side partial view of the partially deconstructed header assembly severing stalked crops.
Figure 6:
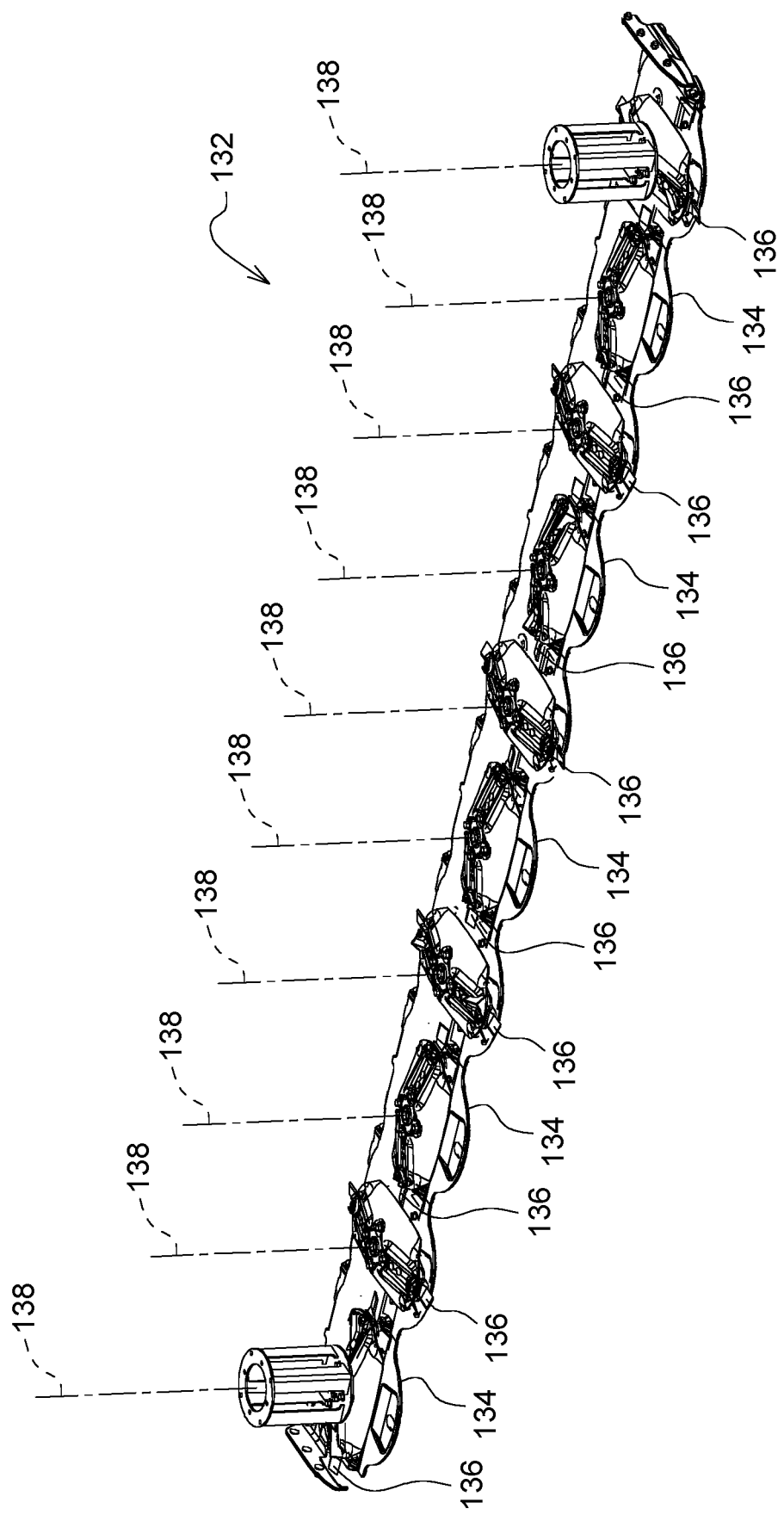
FIG. 6 is a perspective view of a cutterbar.

Referring now to FIGS. 5 and 6, the header assembly 120 is illustrated as a windrowing unit, but could be a mowing unit, grain harvesting unit, or corn harvesting unit, to name a few examples. The header assembly 120 includes a cutterbar 132 that is supported by the header assembly 120. The cutterbar 132 includes a plurality of rotary heads 134. Each rotary head 134 includes a plurality of blades 136. Each rotary head 134 is configured to rotate about a central axis 138 such that the blades 136 contact and sever crops. FIG. 5 illustrates the blades contacting and severing crops. The blades 136 have a slight twist such that the rotating blade 136 cuts the crop upon impact and lifts the crop upward. This aids in directing the cut crop inside the header assembly and in achieving a cleaner cut. One of skill in the art will appreciate that this works best with upright and sturdy crops.

The header assembly includes a plurality of conditioning cylinders 140. The conditioning cylinders 140 crimp and crush the cut crop to promote faster and more even drying. The header assembly further includes a feederhouse 142 that receives the cut crop after it has passed through the conditioning cylinders 140. The cut crop is then deposited on the ground surface 104 in a uniform pattern, known to those of skill in the art as a windrow, to promote faster and more even drying. In other examples, the cut crop may be threshed and chopped before being deposited on the ground surface 104, or the cut crop may be processed and collected.

Figure 7:
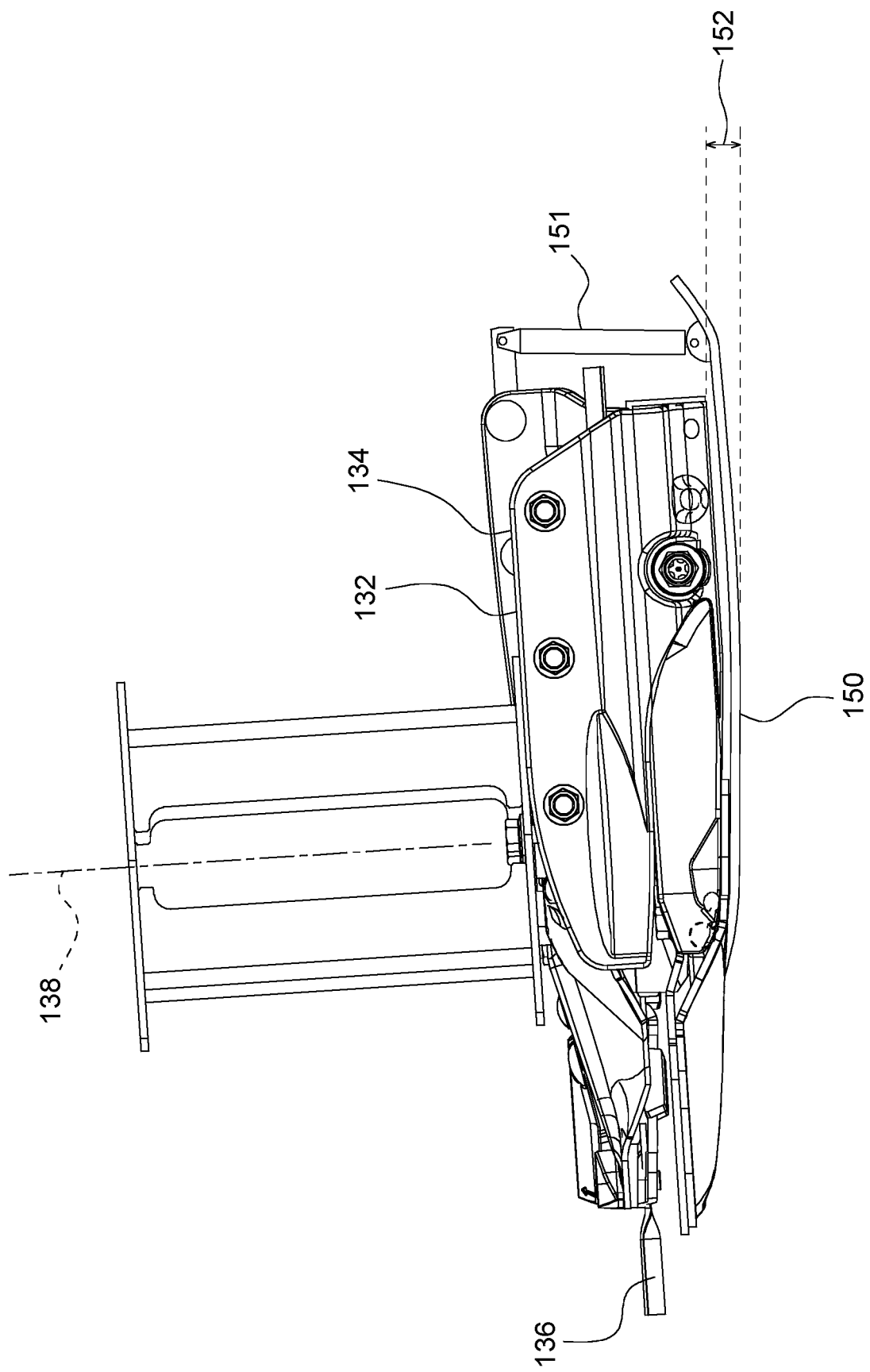
FIG. 7 is a left side view of the cutterbar including a gauge shoe and a gauge shoe actuator. The gauge shoe actuator is shown in a retracted position.
Figure 8:
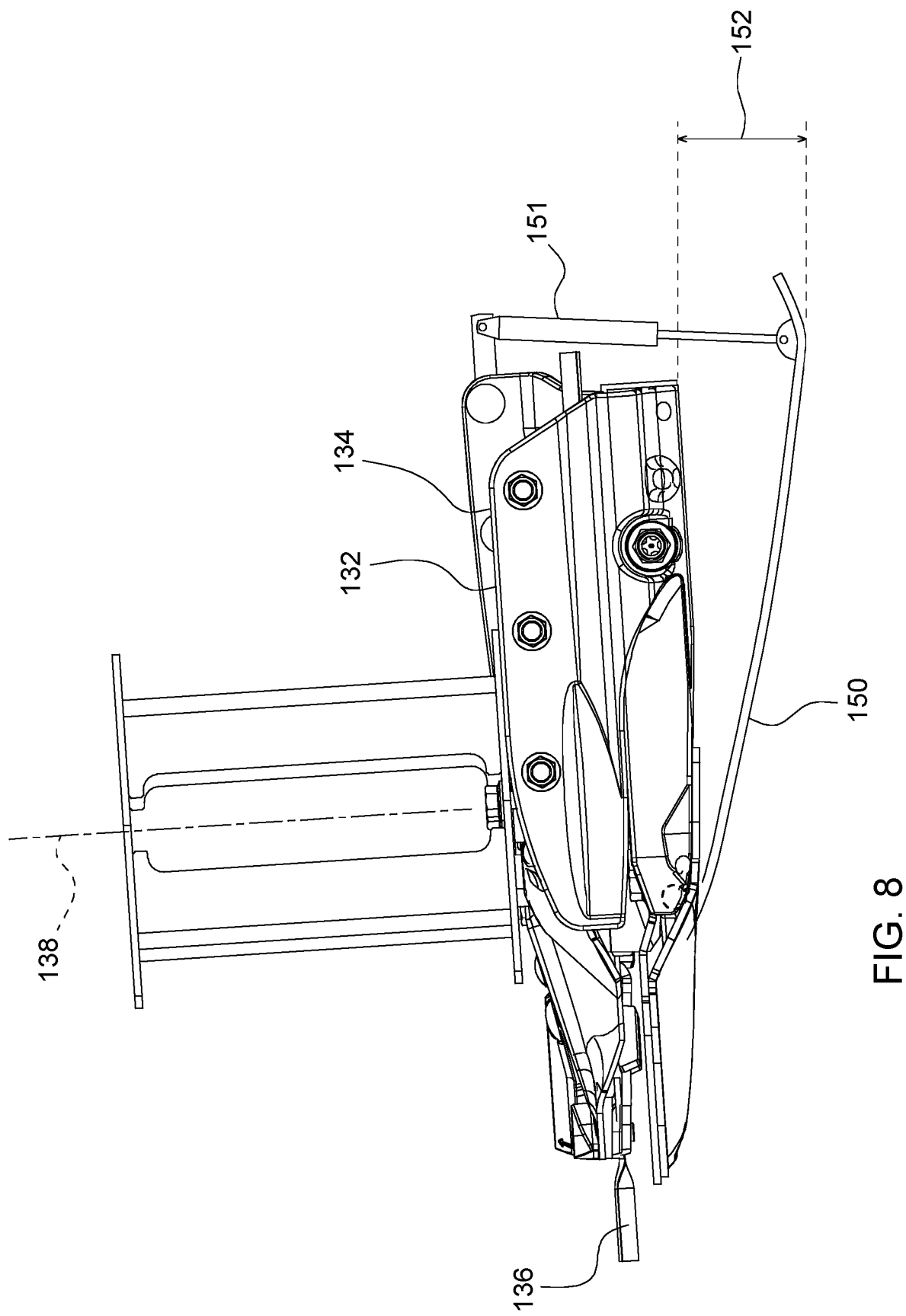
FIG. 8 is a left side view of the cutterbar including the gauge shoe and the gauge shoe actuator. The gauge shoe actuator is shown in an extended position.

Referring to FIGS. 7 and 8, the header assembly 120 includes one or more gauge shoes 150 that are supported by the cutterbar 132. The gauge shoes 150 are each a ground-engaging skid plate. The gauge shoe 150 is configured to be the first portion of the header assembly 120 that contacts the ground surface 104.

The header assembly 120 further includes one or more gauge shoe actuators 151 that are connected to a respective one of the one or more gauge shoes 150. The gauge shoe actuator 151 is configured to adjust a gauge shoe extension 152 relative to the cutterbar 132. FIGS. 7 and 8 illustrate the gauge shoe actuator 151 as a hydraulic cylinder. This is an example of one type of gauge shoe actuator 151. Other types of actuators could be used, such as electrically powered linear actuators.

When the gauge shoe actuator 151 is retracted, the gauge shoe 150 is lifted toward the cutterbar, thereby decreasing the gauge shoe extension 152. FIG. 7 illustrates the gauge shoe actuator 151 in a fully retracted position with the gauge shoe 150 positioned against the cutterbar 132. When the gauge shoe actuator 151 is extended, the gauge shoe 150 is lowered away from the cutterbar 132, thereby increasing the gauge shoe extension 152. FIG. 8 illustrates the gauge shoe actuator 151 in a fully extended position with the gauge shoe 150 positioned away from the cutterbar 132.

Figure 9:
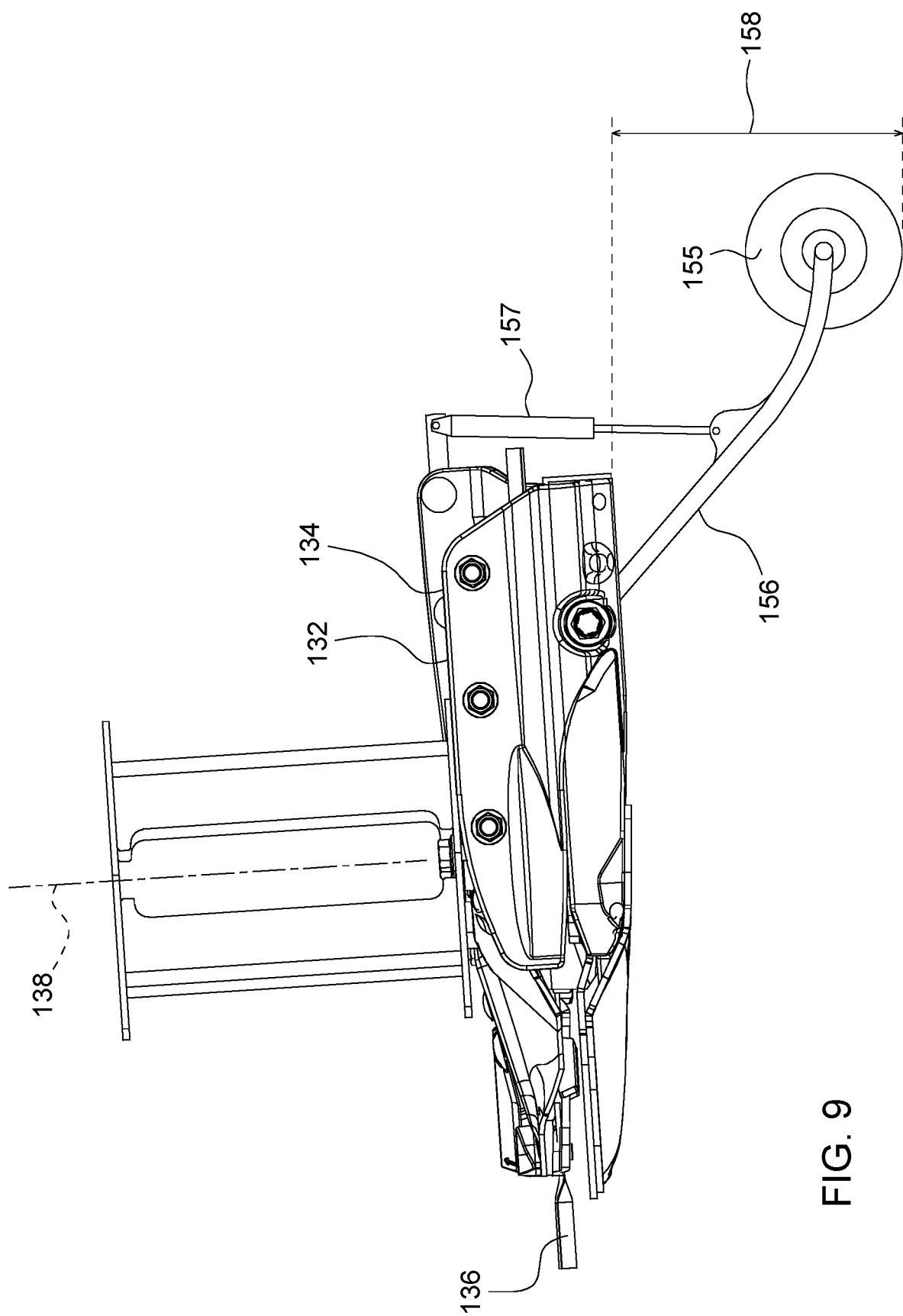
FIG. 9 is a left side view of the cutterbar including a gauge wheel, a gauge wheel linkage, and a gauge wheel actuator. The gauge wheel actuator is shown in an extended position.

Referring to FIG. 9, the header assembly 120 can alternatively include one or more gauge wheels 155 that are supported by the cutterbar 132 instead of using the gauge shoes 150. Each gauge wheel 155 is pivotally attached to the cutterbar 132 or the header assembly 120 by linkage 156. The gauge wheels 155 are configured to be the first portion of the header assembly 120 that contact the ground surface 104. The position of the gauge wheel 155 relative to the cutterbar 132 can be set using a gauge wheel actuator 157. The gauge wheel actuator 157 is configured to adjust a gauge wheel extension 158 relative to the cutterbar 132. FIG. 9 illustrates the gauge wheel actuator 157 as a hydraulic cylinder. This is an example of one type of gauge wheel actuator 157. Other types of actuators could be used, such as electrically powered linear actuators.

The agricultural harvester machine 100 includes at least a first sensor 160 configured to sense at least an orientation of stalked crops in a path of the agricultural harvester machine 100. The sensor 160 may be an image sensor that captures images, such as a camera sensor, including ultrasonic sensors, laser sensors, and infrared sensors. The sensor 160 may also be any sensor which may sense at least an orientation of stalked crops. The sensor 160 is configured to sense the orientation of stalked crop in the path of the agricultural harvester machine 100 and to output a crop orientation signal.

Figure 10:
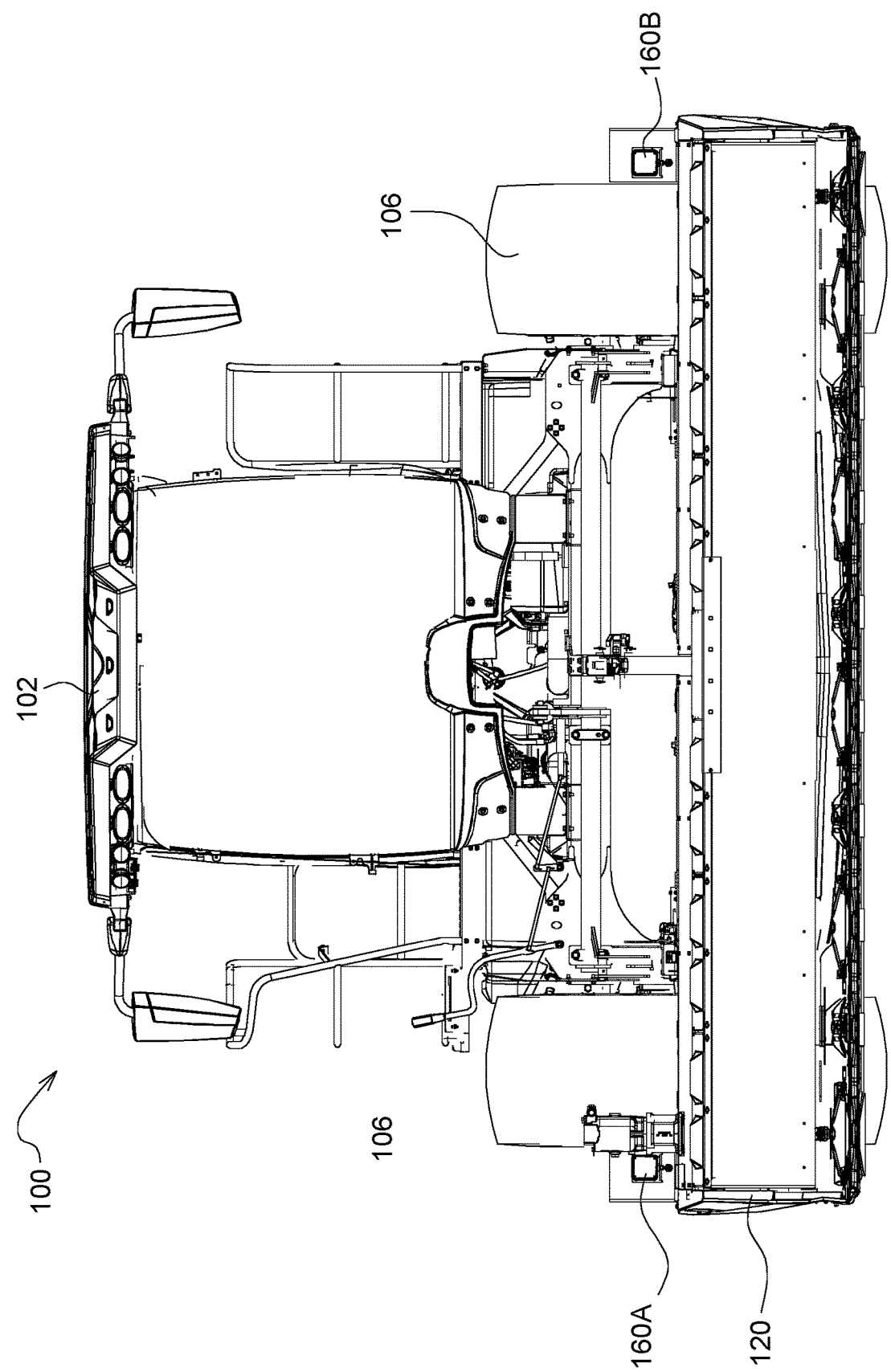
FIG. 10 is a front view of the agricultural harvester machine including a plurality of sensors.

The agricultural harvester machine 100 may include a single sensor 160 or may include a plurality of sensors 160. FIG. 10 illustrates a plurality of sensors 160A and 160B mounted to the agricultural harvester machine 100. The sensors 160 may be mounted on the header assembly 120, on the operator station 102, or on any portion of the agricultural harvester machine 100.

Figure 11:
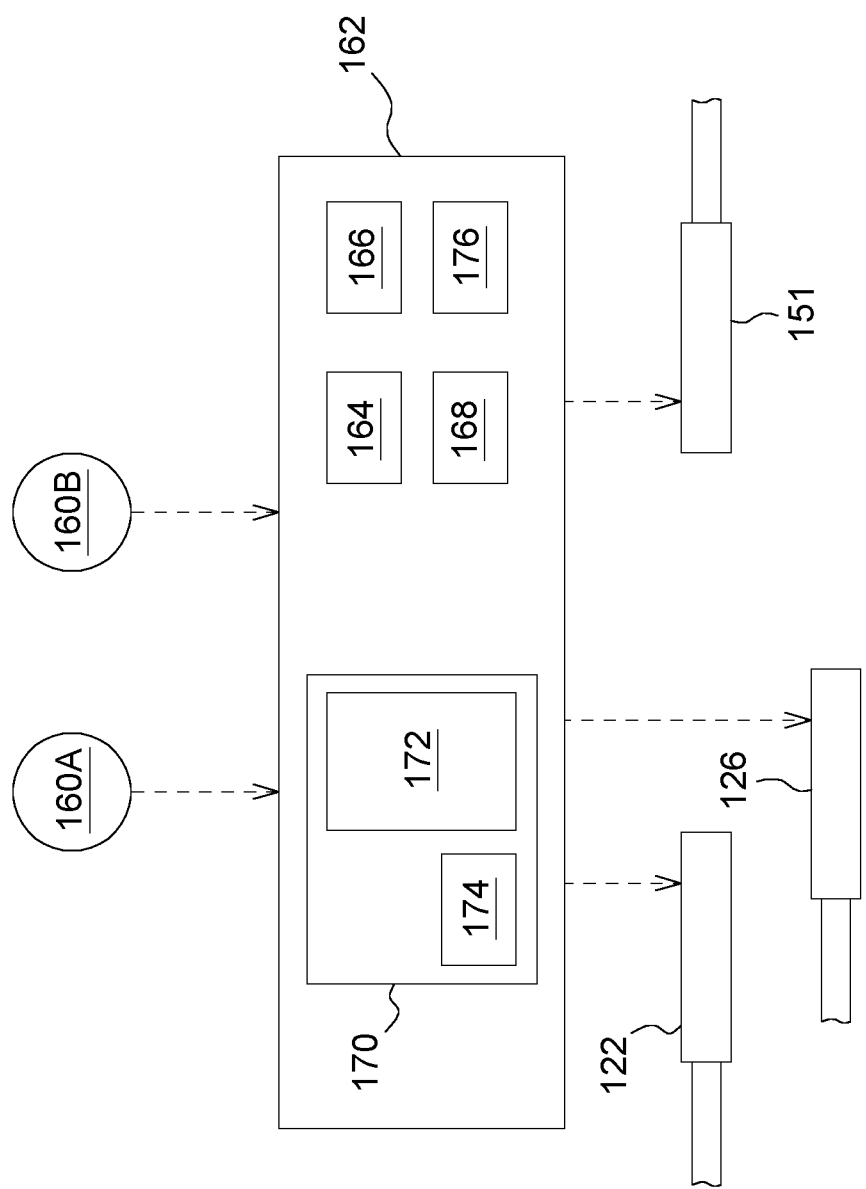
FIG. 11 is a schematic drawing of the controller and the various sensors and actuators of the agricultural harvester machine.

As schematically illustrated in FIG. 11, the agricultural harvester machine 100 includes a controller 162. The controller 162 may be part of a machine control system of the agricultural harvester machine 100, or it may be a separate control module. The controller 162 may, for example, be mounted in a control panel located at the operator station 102. The controller 162 is configured to receive input signals from the various sensors. The signals transmitted from the various sensors to the controller 162 are schematically indicated in FIG. 11 by lines connecting the sensors 160 to the controller 162 with an arrowhead indicating the flow of the signal from the sensor to the controller 162.

For example, crop orientation signals from sensors 160A and 160B will be received by controller 162 so that the controller 162 can monitor and control the operation of the agricultural harvester machine 100 including the position and orientation of the header assembly 120.

Similarly, the controller 162 will generate control signals for controlling the operation of the agricultural harvester machine 100, including the various actuators discussed above, which control signals are indicated schematically in FIG. 11 by lines connecting the controller 162 to graphic depictions of the various actuators with the arrow indicating the flow of the command signal. It will be understood that for control of a hydraulic cylinder type actuator, the controller 162 will send an electrical signal to an electro/mechanical control valve (not shown) which controls flow of hydraulic fluid to and from the hydraulic cylinder.

Controller 162 includes or may be associated with a processor 164, a computer readable medium 166, a data base 168 and an input/output module or control panel 170 having a display 172. An input/output device 174, such as a keyboard, joystick or other user interface, is provided so that the human operator may input instructions to the controller. It is understood that the controller 162 described herein may be a single controller having all of the described functionality, or it may include multiple controllers wherein the described functionality is distributed among the multiple controllers.

Various operations, steps, or algorithms as described in connection with the controller 162 can be embodied directly in hardware, in a computer program product 176 such as a software module executed by the processor 164, or in a combination of the two. The computer program product 176 can reside in RAM memory, flash memory, ROM memory, EPROM memory, EEPROM memory, registers, hard disk, a removable disk, or any other form of computer-readable medium 166 known in the art. An exemplary computer-readable medium 166 can be coupled to the processor 164 such that the processor can read information from, and write information to, the memory/storage medium. In the alternative, the medium can be integral to the processor 164. The processor 164 and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The sensor 160 is configured to capture images of the crop profile. The controller 162, using image processing or machine learning techniques, can determine the orientation of the crop, such as laying down in a forward direction, laying down in a backward direction, laying to the left side, laying to the right side, or upright, to name a few orientations.

The controller is configured to regulate any one or more of a number of parameters at least in part in response to the crop orientation signal. Each of these parameters may affect the effectiveness of the header assembly in cutting the crop.

The controller may be configured to output a header assembly angle control signal to regulate the header assembly angle 128 relative to the machine frame 108 at least in part in response to the crop orientation signal. The controller may be configured to output a header assembly height control signal to regulate the header assembly height 124 relative to the ground surface 104 at least in part in response to the crop orientation signal. The controller may be configured to regulate a float pressure holding the header assembly 120 in position relative to the ground surface 104 as the header assembly 120 moves across the crops at least in part in response to the crop orientation signal. The controller may be configured to regulate a machine speed relative to the ground surface 104 at least in part in response to the crop orientation signal. The controller may be configured to regulate the gauge shoe extension 152 relative to the cutterbar 132 at least in part in response to the crop orientation signal.

When the harvester machine is set up for a particular harvesting job the various parameters will typically be set at initial values which are optimized for those portions of the field where the crop is standing straight. As the harvester machine moves through the field various parameters may be adjusted in response to a crop orientation signal indicating that the crop immediately in front of the machine is bent over in one direction or another. If the crop is bent over toward the oncoming harvester machine there may be no need for adjustment, because the header assembly 120 may ride under the crop causing the crop to lift toward a vertical position by the time the crop is cut. But if the crop is bent away from the oncoming harvester machine or to one side it may be desirable to adjust one or more parameters to improve the cutting of the bent crop. The following examples will describe the adjustment that may be made for a crop that is bent away from the oncoming harvester machine, but it will be understood that these same adjustments or different adjustments may be made for a crop bent to one side. Any one of the following parameters can be adjusted individually. Alternatively, any combination of the parameters can be adjusted simultaneously.

The controller 162 may be configured such that when the crop orientation signal indicates the stalked crops are laying down in a forward direction, the header assembly angle 128 relative to the machine frame is increased by extending the tilt actuator 126 such that the header assembly pivots about pivotal connection 127. An increased header assembly angle 128 allows blades 136 to contact the stalked crop closer to the ground surface 104, in turn creating a cleaner cut. The blades can stay under the stalked crop and the header assembly 120 is prevented from riding up and over various crops.

The controller 162 may be configured such that when the crop orientation signal indicates the stalked crops are laying down in a forward direction, the header assembly height 124 relative to the ground surface 104 is decreased by extending the lift actuator 122. A decreased header assembly height 124 allows blades 136 to contact the stalked crop closer to the ground surface 104, in turn creating a cleaner cut. The blades can stay under the stalked crop and the header assembly 120 is prevented from riding up and over various crops.

The controller 162 may be configured such that when the crop orientation signal indicates the stalked crops are laying down in a forward direction, a hydraulic pressure applied to the lift cylinders 122 holding the header assembly 120 in position relative to the machine frame is increased to hold the header assembly 120 down and prevent it from riding up on top of the bent crop. This hydraulic pressure applied to the lift cylinders 122 may be referred to as a header assembly float pressure.

The controller 162 may be configured such that when the crop orientation signal indicates the stalked crops are laying in a forward direction, the machine speed is decreased. Decreasing the speed at which the machine travels across the ground may also prevent or reduce the instance of the header assembly 120 riding up on top of the forward bent crops.

The controller 162 may be configured such that when the crop orientation signal indicates the stalked crops are laying in a forward direction, the gauge shoe extension 152 relative to the cutterbar is decreased. The gauge shoe extension 152 is decreased by retracting the gauge shoe actuator 151, thereby allowing for a greater header assembly angle 128 of the header assembly 120 before the gauge shoe 150 engages the ground surface 104. Similarly the controller may adjust the gauge wheel height when using the alternative embodiment of FIG. 9.

Figure 12:
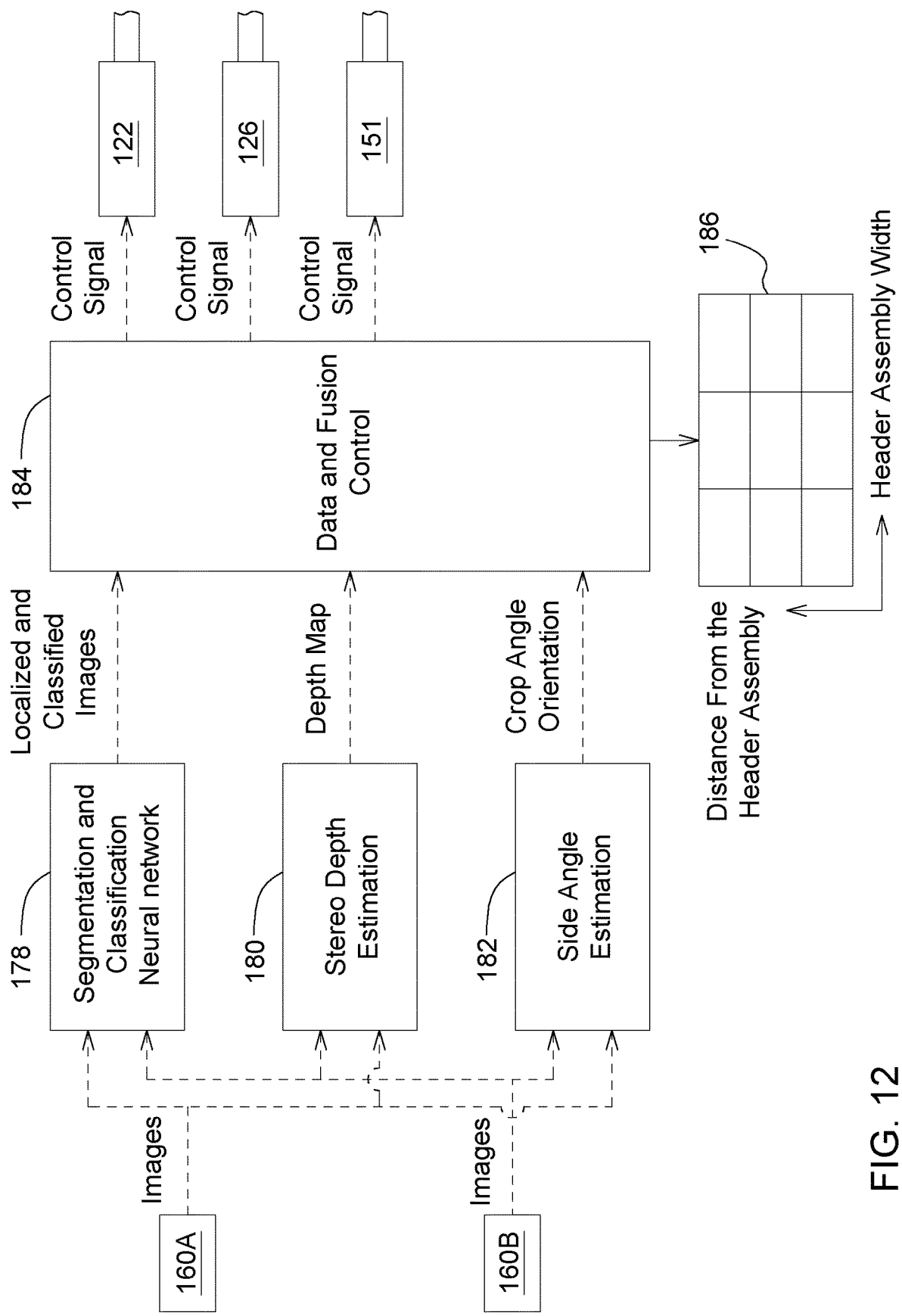
FIG. 12 is a schematic drawing of a control algorithm.

As schematically illustrated in FIG. 12, the controller 162 may include a control algorithm. The sensors 160A and 160B will generate images which are transmitted to a Segmentation and Classification Neural Network block 178, a Stereo Depth Estimation block 180, and a Side Angle Estimation block 182. The images are indicated by lines connecting the sensors 160A and 160B to the Segmentation and Classification Neural Network block 178, the Stereo Depth Estimation block 180, and the Side Angle Estimation block 182.

The Segmentation and Classification Neural Network block 178 transmits localized and classified images to a Data and Fusion Control block 184. The localized and classified images are indicated by a line connecting the Segmentation and Classification Neural Network block 178 to the Data and Fusion Control block 184.

The Stereo Depth Estimation block 180 transmits a depth map to the Data and Fusion Control block 184. The depth map is indicated by a line connecting the Stereo Depth Estimation block 180 to the Data and Fusion Control block 184.

The Side Angle Estimation block 182 transmits a crop angle orientation to the Data and Fusion Control block 184. The crop angle orientation is indicated by a line connecting the Side Angle Estimation block to the Data and Fusion Control block 184. Side angle estimation can be done using either a trained neural network or a combination of feature extraction and mathematical transformations of those features.

The Data and Fusion Control block 184 includes a Data and Fusion sub-block 186. The Data and Fusion sub-block 186 generates a heat map overlaid on a section of crop directly in front of the header assembly 120. The heat map indicates the orientation of various crops at different locations. Based on an estimate of the variance in crop orientation, the Data and Fusion Control block 184 transmits control signals to the lift actuator 122, the tilt actuator 126, and the gauge shoe actuator 151. The control signals are indicated by lines connecting the Data and Fusion Control block 184 to the lift actuator 122, the tilt actuator 126, the gauge shoe actuator 151. The controller may further control the hydraulic pressure directed to the lift cylinders 122 to control the header assembly float pressure holding the header assembly down against the crop. The controller may further send a control signal to control the advance speed of the harvester machine. Any one of the these parameters can be adjusted individually. Alternatively, any combination of these parameters can be adjusted simultaneously.

Prior art self-propelled agricultural harvester machines suffer from poor cutting performance when encountering crops which are laying down which in turn leads to crop loss. A skillful operator must make multiple adjustments to the agricultural harvester machine to obtain better performance. These adjustment amount to costly machine downtime. The agricultural harvester machine 100 as disclosed herein senses the orientation of crops and automatically makes the adjustments necessary for improved performance.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled agricultural harvester machine, comprising:
   a machine frame;
   a plurality of ground engaging units for supporting the machine frame from a ground surface;
   a header assembly for harvesting stalked crops, the header assembly being supported from the machine frame so that the header assembly can be raised, lowered, and tilted relative to the machine frame;
   at least a first sensor configured to sense at least an orientation of the stalked crops in a path of the agricultural harvester machine, the first sensor configured to output a crop orientation signal; and
   a controller configured to:
      receive the crop orientation signal from the first sensor; and
      regulate a header assembly angle relative to the machine frame at least in part in response to the crop orientation signal; and
   wherein the controller is configured such that when the crop orientation signal indicates the stalked crops are laying down in a forward direction, the header assembly angle relative to the machine frame is increased.

2. The self-propelled agricultural harvester machine of claim 1, wherein the controller is further configured to:
   regulate a header float pressure relative to the ground surface at least in part in response to the crop orientation signal, and
   regulate a machine speed relative to the ground surface at least in part in response to the crop orientation signal.

3. The self-propelled agricultural harvester machine of claim 1, wherein the header assembly further comprises:
   one or more gauge shoes or gauge wheels supported by the header assembly;
   a cutterbar supported by the header assembly; and
   wherein the controller is configured to regulate a gauge shoe or gauge wheel extension at least in part relative to the cutterbar in response to the crop orientation signal.

4. The self-propelled agricultural harvester machine of claim 3, wherein one or more gauge shoe actuators or gauge wheel actuators are connected to a respective one of the one or more gauge shoes or gauge wheels and configured to adjust the gauge shoe extension or gauge wheel extension relative to the cutterbar.

5. The self-propelled agricultural harvester machine of claim 3, wherein the controller is configured such that when the crop orientation signal indicates the stalked crops are laying down in a forward direction, the gauge shoe extension or gauge wheel extension relative to the cutterbar is decreased.

6. The self-propelled agricultural harvester machine of claim 1, wherein the at least one sensor includes two or more sensors.

7. The self-propelled agricultural harvester machine of claim 1, wherein the at least one sensor is a camera sensor.

8. The self-propelled agricultural harvester machine of claim 1, further comprising:
   one or more lift actuators configured to adjust a header assembly height relative to the ground surface; and
   wherein the controller is configured to output a header assembly height control signal; and
   each of the one or more lift actuators are configured to adjust the header assembly height at least in part in response to the header assembly height control signal.

9. The self-propelled agricultural harvester machine of claim 1, further comprising:
   one or more tilt actuators configured to adjust a header assembly angle relative to the machine frame;
   wherein the controller is configured to output a header assembly angle control signal; and
   the one or more tilt actuators are configured to adjust the header assembly angle at least in part in response to the header assembly angle control signal.

10. A self-propelled agricultural harvester machine, comprising:
    a machine frame;
    a plurality of ground engaging units for supporting the machine frame from a ground surface;
    a header assembly for harvesting stalked crops, the header assembly being supported from the machine frame so that the header assembly can be raised, lowered, and tilted relative to the machine frame;
    at least a first sensor configured to sense at least an orientation of the stalked crops in a path of the agricultural harvester machine, the first sensor configured to output a crop orientation signal; and
    a controller configured to receive the crop orientation signal from the first sensor;
    wherein the controller is configured to regulate a header assembly height relative to the ground surface at least in part in response to the crop orientation signal.

11. The self-propelled agricultural harvester machine of claim 10, wherein the controller is configured such that when the crop orientation signal indicates the stalked crops are laying down in a forward direction, the header assembly height relative to the machine frame is decreased.

12. A self-propelled agricultural harvester machine, comprising:
    a machine frame;
    a plurality of ground engaging units for supporting the machine frame from a ground surface;
    a header assembly for harvesting stalked crops, the header assembly being supported from the machine frame so that the header assembly can be raised, lowered, and tilted relative to the machine frame;
    at least a first sensor configured to sense at least an orientation of the stalked crops in a path of the agricultural harvester machine, the first sensor configured to output a crop orientation signal; and
    a controller configured to receive the crop orientation signal from the first sensor;
    wherein the controller is configured to regulate a header float pressure relative to the ground surface at least in part in response to the crop orientation signal.

13. The self-propelled agricultural harvester machine of claim 12, wherein the controller is configured such that when the crop orientation signal indicates the stalked crops are laying down in a forward direction, the header float pressure is increased.

14. A self-propelled agricultural harvester machine, comprising:
    a machine frame;
    a plurality of ground engaging units for supporting the machine frame from a ground surface;
    a header assembly for harvesting stalked crops, the header assembly being supported from the machine frame so that the header assembly can be raised, lowered, and tilted relative to the machine frame;
    at least a first sensor configured to sense at least an orientation of the stalked crops in a path of the agricultural harvester machine, the first sensor configured to output a crop orientation signal; and
    a controller configured a controller configured to receive the crop orientation signal from the first sensor;
    wherein the controller is configured to regulate a machine speed relative to the ground surface at least in part in response to the crop orientation signal.

15. The self-propelled agricultural harvester machine of claim 14, wherein the controller is configured such that when the crop orientation signal indicates the stalked crops are laying down in a forward direction, the machine speed is decreased.

* * * * *